United States Patent [19]

Lacey

[11] 3,741,238
[45] June 26, 1973

[54] IRRIGATION HOSE COUPLING AND PULL END

[76] Inventor: Edward H. Lacey, P. O. Box 796, Trent, S. Dak. 57065

[22] Filed: Dec. 2, 1970

[21] Appl. No.: 94,252

[52] U.S. Cl. ............... 137/344, 239/189, 239/213, 285/5, 285/255
[51] Int. Cl. .................... B05b 9/02, E01h 3/02
[58] Field of Search .................. 239/183, 189, 191, 239/212, 213; 137/344; 285/255, 253, 5

[56] References Cited
UNITED STATES PATENTS

| | | | |
|---|---|---|---|
| 1,943,496 | 1/1934 | Thompson | 285/5 |
| 2,652,282 | 9/1953 | Willetts | 239/213 X |
| 2,743,958 | 5/1956 | Landry | 239/212 UX |
| 2,973,780 | 3/1961 | Coover | 285/5 X |
| 3,057,559 | 10/1962 | Ingram et al. | 239/213 |
| 3,295,548 | 1/1967 | Woods | 137/344 |
| 3,361,449 | 1/1968 | Parro | 285/255 X |
| 3,489,352 | 1/1970 | Diggs | 239/189 |
| 3,507,336 | 4/1970 | Nelson | 239/183 X |
| 3,560,028 | 2/1971 | Ohba | 285/255 |
| 3,623,663 | 11/1971 | Koinzan | 137/344 X |

Primary Examiner—Samuel Scott
Attorney—Clarence A. O'Brien and Harvey B. Jacobson

[57] ABSTRACT

A high tension withstanding pull hose coupling including a first tubular water inlet pipe assembly mounted on a travelling support and including a rear inlet end opening outwardly in the direction opposite to the direction of movement of the support. The inlet end of the water inlet pipe assembly defines downstream tapering outer frusto-conical wedge surfaces and a wedge sleeve is loosely telescoped over the inlet end and includes downstream tapering inner frusto-conical wedge surfaces. An elongated tubular hose includes an outlet end telescoped over the outer wedge surfaces of the water inlet pipe assembly and the sleeve is telescoped over the hose outlet end with the wall portions of the hose outlet end clamped between the inner and outer conical surfaces of the sleeve and water inlet pipe assembly.

5 Claims, 9 Drawing Figures

PATENTED JUN 26 1973

Edward H. Lacey
INVENTOR.

BY *Clarence A. O'Brien*
*and Harvey B. Jacobson*
Attorneys

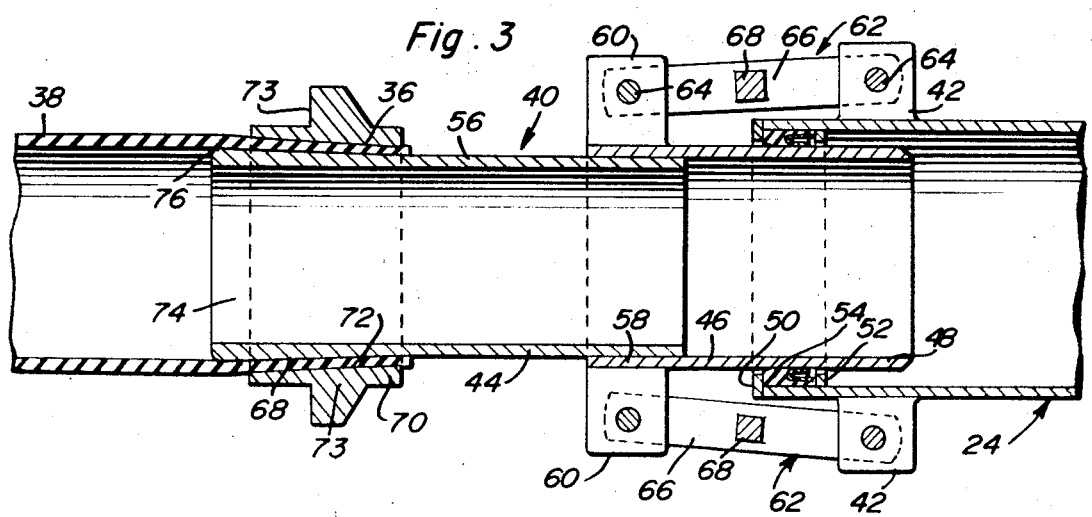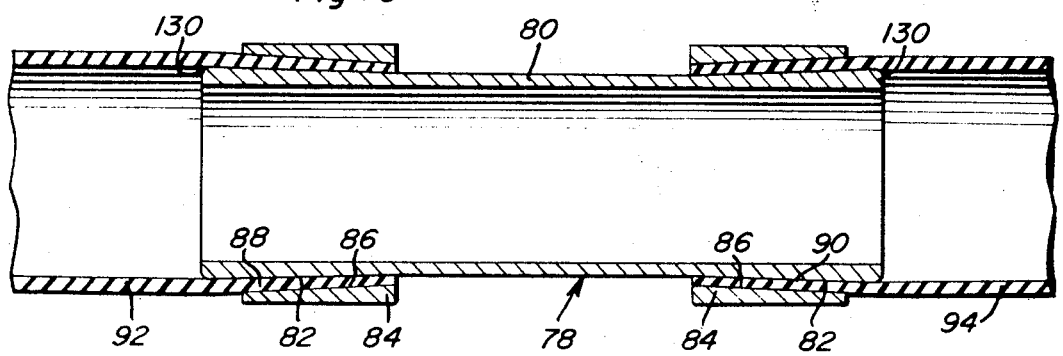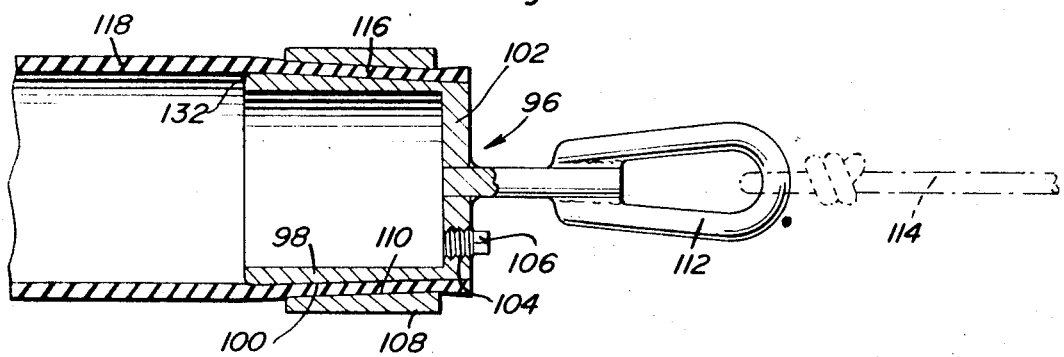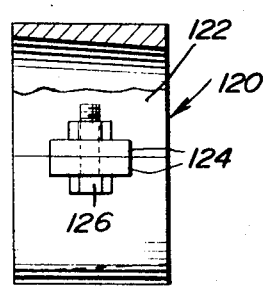

IRRIGATION HOSE COUPLING AND PULL END

There are presently in use irrigation systems which utilize mobile supports movable in one direction along a predetermined path and including a water inlet pipe assembly opening rearwardly in the direction of movement of the support. The outlet end of a high tension withstanding pull hose is coupled to the water inlet pipe assembly and the inlet end of the hose is coupled to a suitable source of water under pressure disposed intermediate the opposite ends of the path along which the support is movable. Means is provided on the support for drawing the latter along its predetermined path of movement and the high tension withstanding pull hose extends from the source of water to the support at its starting point along its path of intended movement. The support includes water outlet irrigation nozzle means whereby irrigation water is applied to the ground as the support moves along its predetermined path and the hose is pulled along the predetermined path of movement of the support toward the end of its path of intended movement. In this manner, a hose of 300 or 400 feet in length may be utilized to supply water to the support during its movement along a path substantially double the length of the hose.

Of course, when the support is nearing its limit of movement along its intended path of movement, substantially all of the hose is being pulled along behind the support, and not only is the hose required to withstand high internal pressures but also to withstand high tension forces.

For this reason, highly developed irrigation hose is needed and an effective means must be provided for attaching the outlet end of the hose to the support whereby the necessary pull on the hose will not cause a rupture of the latter. In addition, when a section of hose which is several hundred feet in length becomes damaged, suitable means must be provided for repair of the hose in a manner to enable it to still withstand high internal pressures and high tensional forces. Further, in order to minimize the possibility of failure of the hose while in use, suitable means must be provided whereby the hose may be at least occasionally tested while under internal pressures and tensional forces beyond that which the hose will be required to withstand while in use.

Accordingly, it is the main object of this invention to provide a novel hose coupling for coupling a supply hose of the pump type to a movable support of the aforementioned type.

A further object of this invention, in accordance with the immediately preceding object, is to provide a splice assembly for a pull hose whereby adjacent ends of aligned hose sections may be spliced together without reduction of the internal pressure and tension withstanding capabilities of the hose sections adjacent the splice.

Yet another object of this invention is to provide an end plug for a pull hose of the aforementioned type that may be utilized to admit water under pressure into a hose section being tested while simultaneously also serving to apply tension to the hose.

Yet another important object of this invention is to provide a hose coupling in accordance with the first mentioned object and including structure by which the outlet end of the pull hose may be slightly angularly displaced relative to the inlet end of the water inlet pipe assembly carried by the aforementioned support.

A final object of this invention to be specifically numerated herein is to provide an assembly which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 3 is an enlarged fragmentary vertical sectional view taken substantially upon the plane indicated by the section line 3—3 of FIG. 2;

FIG. 5 is an enlarged fragmentary sectional view taken substantially upon the plane indicated by section line 5—5 of FIG. 4;

FIG. 7 is an enlarged fragmentary sectional view taken substantially upon the plane indicated by section line 7—7 of FIG. 6;

FIG. 8 is a side elevational view of a modified form of clamping sleeve constructed in accordance with the present invention and with portions of the modified clamp sleeve being broken away and illustrated in vertical section.

Figure 1:
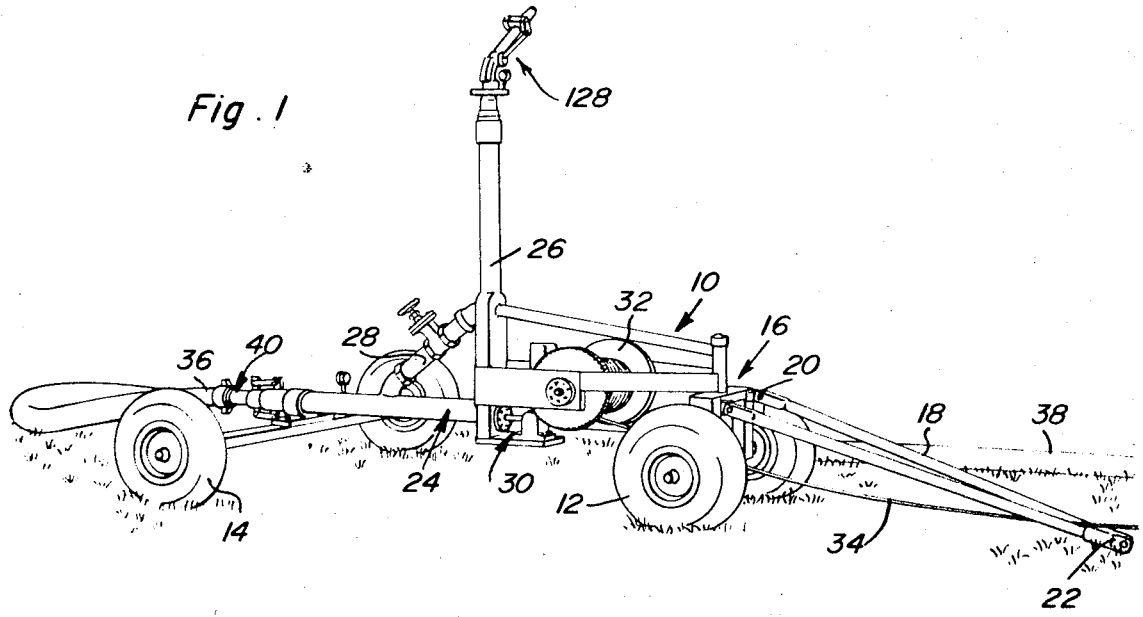
FIG. 1 is a perspective view of an irrigation system of the aforementioned type including a cable drum driven movable support and with which the coupling assembly of the instant invention is being used to couple a water supply hose to the water inlet pipe assembly of the movable support.

Referring now more specifically to the drawings, the numeral 10 generally designates a mobile support which includes front ground engaging support wheels 12 and rear ground engaging support wheels 14. The front wheels 12 are supported from a support assembly referred to in general by the reference numeral 16 oscillatable about an upstanding axis and a forwardly extending tongue 18 is pivotally secured to the support assembly 16 as at 20. The tongue 18 is oscillatable with the support assembly 16 and the wheels 12 supported therefrom and includes a cable guide structure 22 on its forward end.

The support 10 includes a water inlet pipe assembly referred to in general by the reference numeral 24 communicated with a standpipe 26 by means of a valved pipe assembly 28. In addition, the water inlet pipe assembly 24 is also communicated with a fluid motor assembly 30 for actuation of the latter and the fluid motor assembly is drivingly connected to a journalled cable drum 32 upon which one end of a pull cable 34 is wound. The pull cable 34 is anchored at a remote location and winding of the cable 34 onto the drum 32 functions to pull the support 10 toward that remote location.

In order to insure that the support 10 will follow a straight path toward the aforementioned remote location, the guide structure 22 carried by the forward end of the tongue 18 is guidingly engaged with the cable 34 whereby the support 10 will follow the cable 34. In addition, the water inlet pipe assembly 24 has the outlet end 36 of a water supply hose 38 coupled thereto by means of a hose coupling assembly referred to in general by the reference numeral 40 and the inlet end of the hose 38 is communicated with a source of water under pressure half-way between the starting point of the support 10 and the remote location at which the extended end of the cable 34 is anchored.

Figure 2:
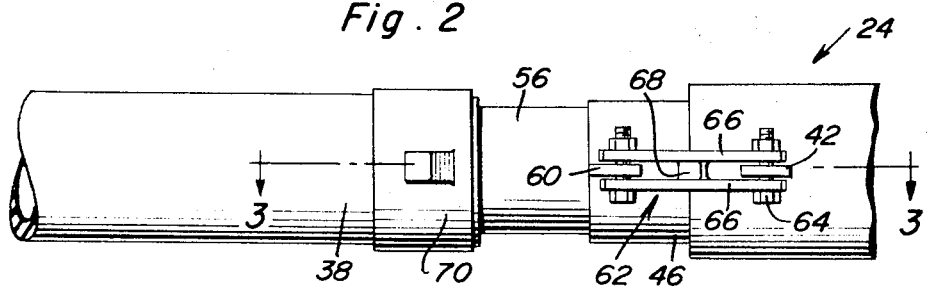
FIG. 2 is a fragmentary top plan view of the coupling assembly.

With attention now invited more specifically to FIGS. 2 and 3 of the drawings it may be seen that the inlet end of the water inlet pipe assembly 24 is provided with a pair of diametrically opposite outwardly projecting apertured ears 42. In addition to the ears 42, the hose coupling assembly 40 includes a tubular pipe section 44 having one end portion 46 thereof disposed with its terminal end 48 loosely telescoped in the inlet end of the water inlet pipe assembly 24. The water inlet assembly 24 includes a pair of axially spaced radially inwardly projecting annular retaining flanges 50 and 52 between which a pressure actuated seal 54 is disposed. When water pressure is maintained within the water inlet pipe assembly 24, those portions of the seal 54 engaged with the inner surfaces of the water inlet pipe assembly 24 and the outer surfaces of the terminal end 48 are pressed into tight sealing engagement therewith. Thus, a water tight seal is maintained between the tubular pipe section 44 and the water inlet pipe assembly 24.

However, it will be noted that the inner diameter of the retaining flanges 50 and 52 is slightly greater than the outside diameter of the terminal end 48 of the tubular pipe section 44 and therefore that the tubular pipe section 44 may be slightly angulated relative to the water inlet pipe assembly 24 while still maintaining a fluid tight seal between the terminal end 48 and the water inlet pipe assembly 24 by means of the seal 54.

The tubular pipe section 44 is comprised of the end portion 46 and a second end portion 56. The adjacent ends of the end portions 46 and 56 are secured together in fluid tight telescoped engagement with the sections 44 and 56 rigid relative to each other. The terminal end 58 of the end portion 46 also includes a pair of diametrically opposite outwardly projecting apertured ears 60 and a pair of clevises generally referred to by the reference numerals 62 are interconnected between corresponding apertures ears 42 and 60 by means of removable fasteners 64. The clevises 62 each comprise a pair of laterally spaced elongated plates 66 secured together and spaced apart centrally intermediate their opposite ends by means of a spacing block 68 rigidly secured therebetween. Corresponding ends of each pair of elongated plates 66 are provided with registered apertures or bores 69 and the fasteners 64 are each secured through one of the apertured ears 42 or 60 and the corresponding pair of bores 69. Further, from FIG. 3 of the drawings it will be noted that the clevises 62 are slightly convergent toward the end portion 56. In this manner, the clevises 62 have a self-centering action on the tubular pipe section 44 and tend to resist angular displacement of the pipe section 44 relative to the water inlet pipe assembly 24. Of course, the ears 42 and 60 as well as the clevises 62 may be doubled in number so that four connecting assemblies disposed 90° apart about the water inlet pipe assembly 24 may be utilized to secure the tubular pipe section 44 to the water inlet pipe assembly 24.

The end of the end portion 56 remote from the end portion 46 includes downstream tapering outer frusto-conical wedge surfaces 68 and a sleeve 70 is disposed on the tubular pipe sections 44 and includes downstream tapering internal frusto-conical surfaces 72 as well as outstanding lugs 73 for a purpose to be more fully set forth herein after.

The outlet end 36 of the hose 38 is first telescoped over the terminal end 74 of the end portion 56 while the sleeve 70 is dispoaced toward the ears 60. Thereafter, the sleeve 70 is telescoped over the outlet end 36 of the hose 38 whereby the outlet end is tightly clamped between the wedge surfaces 68 and 72. Of course, any rearward pull on the hose 38 tends to cause the sleeve 70 to also move in an upstream rearward direction thereby resulting in the outlet end 36 of the hose 38 being even more tightly clamped between the surfaces 68 and 72.

The end face of the terminal end 72 is radiused as at 76 to prevent the end face from cutting into the adjacent portions of the outlet end 36 of the hose 38. Thus, it may be seen that considerable tensional forces may be applied without adverse effect on the hose 38 at the hose coupling assembly 40.

Figure 4:
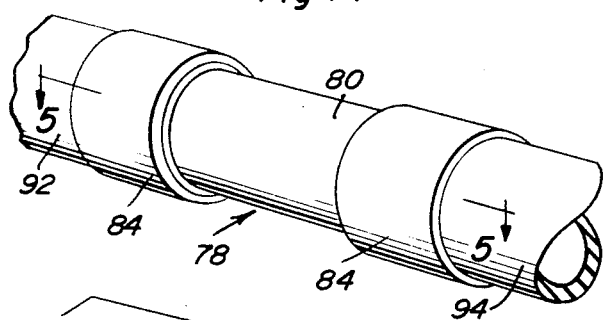
FIG. 4 is a fragmentary perspective view of a hose splicing assembly constructed in accordance with the present invention.

With attention now directed more specifically to FIGS. 4 and 5 of the drawings there may be seen a splice assembly referred to in general by the reference numeral 78 and which utilizes a tubular pipe section 80 similar to the section 44 but which includes conical surfaces 82 on its opposite ends corresponding to the surfaces 68. In addition, a pair of sleeves 84 including conical surfaces 86 and similar to the sleeve 70 are provided and utilized to secure the terminal ends 88 and 90 of a pair of adjacent hose ends 92 and 94 together. Of course, the terminal ends 88 and 90 are secured to the opposite ends of the tubular section 78 in the same manner in which the end portion 36 of the hose 38 is secured to the terminal end 74 of the section 44.

Figure 6:
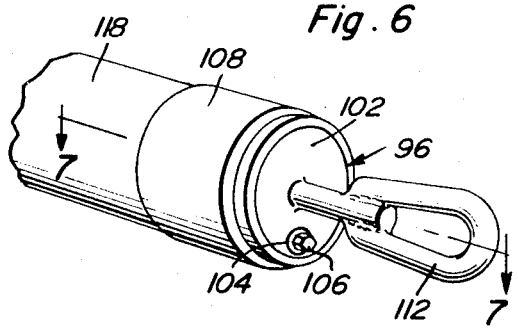
FIG. 6 is a perspective view of a water supply hose end with a testing plug constructed in accordance with the present invention operatively associated therewith.
Figure 9:
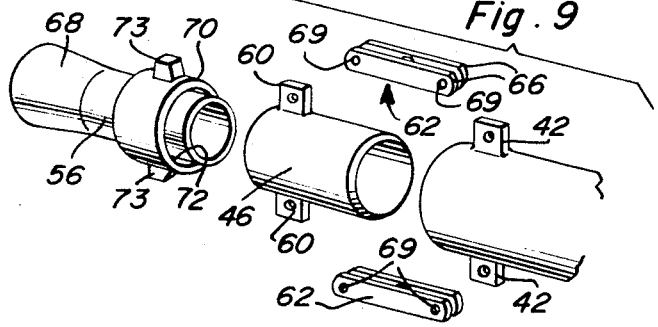
FIG. 9 is an exploded perspective view of the hose coupling.

With attention now invited more specifically to FIGS. 6 and 7 of the drawings, there will be seen a testing plug and anchor assembly referred to in general by the reference numeral 96. The assembly 96 includes a tubular section 98 including outer conical surfaces 100 and an end wall 102 at one end having a threaded bore 104 formed therethrough. A removable plug 106 is threaded in the bore 104 and the assembly 96 includes a sleeve 108 corresponding to the sleeve 70 and including internal conical surfaces 110. In addition, the assembly 96 includes an anchor eye 112 secured to the end wall 102 and to which one end of a tension cable 114 may be secured.

The terminal end 116 of a hose section 118 to be tested is first telescoped over the conical surfaces 100 and the sleeve 108 is thereafter telescoped over the terminal end or end portion 116 of the hose section 118. Thus, the terminal end 116 is securely anchored to the assembly 96 and the plug 106 may be removed so as to admit water under pressure into the hose section 118. In addition, tension may be applied to the cable 114 so as to tension the hose section 118 while under internal pressures.

With attention now invited more specifically to FIG. 8 of the drawings, there may be seen a modified form of sleeve referred to in general by the reference numeral 120 and which may be utilized in lieu of the sleeves 70, 84 and 108. The sleeve 120 is substantially identical to the aforementioned sleeves except that it is formed by a pair of mating half-cylindrical sleeve sections 122 provided with diametrically opposite apertured lugs 124 through which fasteners 126 may be secured in order to clamp the half-sections 122 together.

The standpipe 26 of the support 10 is topped by a rotary water outlet nozzle assembly 128 and water supplied to the support 10 through the water inlet pipe assembly 24 is discharged through the nozzle assembly 128 in jet form for irrigation purposes as the support 10 is moved along its intended path of movement while pulling the hose 38 behind.

The hose coupling assembly 40 provides an efficient means whereby the outlet end 36 of the hose 38 may be coupled to the water inlet pipe assembly 24 without weakening the hose 38 adjacent the hose coupling assembly 40 in any manner. In addition, the hose coupling assembly 40 allows for slight angulation of the outlet end 36 of the hose 38 relative to the water inlet pipe assembly 24. Further, the splice assembly 78 may be utilized to join together adjacent ends of hose sections and it will be noted that the section 80 is radiused as at 130 on its opposite ends to prevent damage to the hose sections 92 and 94. Further, the testing plug and anchoring assembly 96 may be utilized to apply tension to the hose section 118 and for also subjecting the hose section 118 to internal water pressure. In this manner, a section of hose to be utilized for irrigation purposes in conjunction with the support 10 may be tested before being put in use. Also, the section 98 is radiused as at 132 whereby any possiblity of rendering damage to the hose section 118 is eliminated.

The lugs 73 on the sleeve 70 serve to provide impact surfaces to be struck with a hammer or other impact tool when it is desired to disassemble the sleeve 70. Also, the inside surfaces of the various hose section ends may be lubricated before assembly to prevent the sections 56, 80 and 98 seizing the liners of these hose sections and splitting the hose liners. Also, the pipe section 44 may be of one piece construction and coupling structure may be used at both the inlet and outlet ends of a hose or pipe section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the ivnention as claimed.

What is claimed as new is as follows:

1. In combination with an irrigation hose end portion, a tubular pipe section, one end of said section including tapering outer frusto-conical wedge surfaces over which said hose end portion is telescoped, a wedge sleeve including tapering inner frusto-conical wedge surfaces tightly telescoped over said hose end portion, said wedge surfaces being in radial registry with each other, clampingly engaging said hose end portion therebetween and tapering away from said one end of said pipe section, a water inlet supply pipe supported from a traveling support and opening outwardly at its inlet end in a direction opposite to the direction of intended movement of said support, the other end of said tubular pipe section being loosely telescopingly engaged with said inlet end of said supply pipe, pressure responsive seal means disposed between the confronting telescoped inner and outer surfaces of said supply pipe and pipe section, said pipe and pipe section including pairs of axially spaced correspondingly relatively circumferentially displaced outwardly projecting anchor members, and a plurality of elongated tension members removably connected between each pair of corresponding anchor members outwardly of said pipe and pipe section.

2. The combination of claim 1 wherein the other end of said pipe section includes oppositely tapering outer frusto-conical surfaces, a second hose end portion telescoped over said oppositely tapering conical surfaces, and a second wedge sleeve including inner tapering conical surfaces tightly telescoped over said second hose end portion.

3. The combination of claim 1 wherein said tension members at at least slightly convergent toward the other end of said pipe section.

4. The combination of claim 1 wherein said one end of said pipe section is telescoped in the inlet end of said water supply pipe.

5. In combination with a hose end portion, a tubular pipe section, one end of said section including tapering outer frusto-conical wedge surfaces over which said hose end portion is telescoped, a wedge sleeve including tapering inner frusto-conical wedge surfaces tightly telescoped over said hose end portion said wedge surfaces being in radial registry with each other, clampingly engaging said hose end portion therebetween and tapering away from said one end of said pipe section, and anchor means carried by the other end of said tubular pipe section for applying an end-wise thrust thereto to advance said other end of said tubular pipe section in the direction in which it faces, said anchor means including an inlet supply pipe having opposite ends, the other end of said tubular pipe section being loosely telescopingly engaged with one end of said supply pipe, pressure responsive seal means disposed between the confronting telescoped inner and outersurfaces of said supply pipe and pipe section, said pipe and pipe section including pairs of axially spaced corresponding relatively circumferentially displaced outwardly projecting anchor members, a plurality of elongated tension members removably connected between each pair of corresponding anchor members outwardly of said pipe and pipe section, the other end of said inlet supply pipe being supported from a movable support adapted to be moved in the direction in which said other end of said supply pipe faces. is desired to disassemble the sleeve 70. Also, the inside assembly to prevent the sections 56 80 and 98 seizing the liners

* * * * *